(12) United States Patent
Schmidt et al.

(10) Patent No.: US 12,232,503 B2
(45) Date of Patent: Feb. 25, 2025

(54) METHOD FOR MATURING MEAT

(71) Applicant: MCAIRLAID'S VLIESTOFFE GMBH, Berlingerode (DE)

(72) Inventors: Andreas Schmidt, Duderstadt (DE); Filip Tintchev, Duderstadt (DE); Jens Soder, Gottingen (DE)

(73) Assignee: McAirlaid's Vliesstoffe GmbH, Berlingerode (DE)

( * ) Notice: Subject to any disclaimer, the term of this patent is extended or adjusted under 35 U.S.C. 154(b) by 0 days.

(21) Appl. No.: 14/784,344

(22) PCT Filed: Apr. 16, 2014

(86) PCT No.: PCT/DE2014/100132
§ 371 (c)(1),
(2) Date: Oct. 14, 2015

(87) PCT Pub. No.: WO2014/169901
PCT Pub. Date: Oct. 23, 2014

(65) Prior Publication Data
US 2016/0058021 A1   Mar. 3, 2016

(30) Foreign Application Priority Data

Apr. 16, 2013   (DE) .................. 10 2013 103 834.4

(51) Int. Cl.
*A23B 4/027* (2006.01)
*A23B 4/32* (2006.01)
(Continued)

(52) U.S. Cl.
CPC .............. *A23B 4/027* (2013.01); *A23B 4/325* (2013.01); *A23L 13/72* (2016.08);
(Continued)

(58) Field of Classification Search
CPC .... B01D 53/0407; B01D 53/28; A23B 4/027; A23B 4/325; B65D 81/264; A23L 13/72
(Continued)

(56) References Cited

U.S. PATENT DOCUMENTS 6,675,702 B1 * 1/2004 Maksimow .............. D04H 1/44
  100/41
2004/0247750 A1   12/2004 Finnegan
(Continued)

FOREIGN PATENT DOCUMENTS

CH       400 124 A    10/1965
DE     1 209 982 B     2/1966
(Continued)

OTHER PUBLICATIONS

M. Ščetar et al Trends in meat and meat products packaging—a review Croat. J. Food Sci. Technol. (2010) 2 (1) pp. 32-48.*
ISR for PCT/DE2014/100132 mailed on Aug. 20, 2014.

*Primary Examiner* — Vera Stulii
(74) *Attorney, Agent, or Firm* — Rhodes IP PLC; Kristopher Rhodes

(57) ABSTRACT

The invention concerns a method for the storage and/or aging of meat in which raw meat is stored in the presence of an alkaline and/or alkaline earth metal carbonate, which is made available in a matrix (1) of aligned and/or non-aligned fibers (2), and an element for use in the storage and/or aging of meat, which comprises a layer of ordered and/or unordered fibers and optionally further layers, which element contains alkaline and/or alkaline earth metal carbonates and/or hydrogen carbonates.

Figure 1:
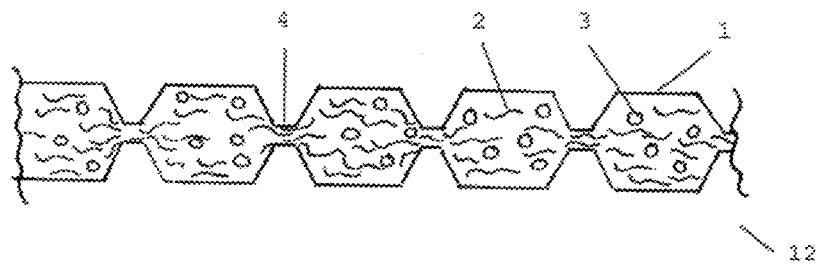

By means of the claimed method, aging of raw meat can be carried out in a simple manner without having to give up the taste quality achieved by dry aging.

14 Claims, 4 Drawing Sheets

(51) Int. Cl.
  *A23L 13/72* (2023.01)
  *B01D 53/04* (2006.01)
  *B01D 53/28* (2006.01)
  *B65D 81/26* (2006.01)

(52) U.S. Cl.
  CPC ......... *B01D 53/0407* (2013.01); *B01D 53/28* (2013.01); *B65D 81/264* (2013.01); *A23V 2002/00* (2013.01); *B01D 2251/30* (2013.01); *B01D 2251/302* (2013.01); *B01D 2251/306* (2013.01); *B01D 2251/402* (2013.01); *B01D 2251/404* (2013.01); *B01D 2251/406* (2013.01); *B01D 2251/408* (2013.01); *B01D 2251/606* (2013.01); *B01D 2257/80* (2013.01); *B01D 2257/90* (2013.01)

(58) Field of Classification Search
  USPC .................. 426/332; 206/204; 442/393, 417
  See application file for complete search history.

(56) References Cited

U.S. PATENT DOCUMENTS

| | | | |
|---|---|---|---|
| 2005/0004541 A1* | 1/2005 | Roberts | B32B 5/28 604/367 |
| 2008/0190786 A1 | 8/2008 | Schmidt | |
| 2008/0249492 A1 | 10/2008 | Schmidt | |
| 2013/0180120 A1 | 7/2013 | Schmidt | |

FOREIGN PATENT DOCUMENTS

| | | |
|---|---|---|
| DE | 695 07 958 T2 | 3/1996 |
| DE | 202 00 661 U1 | 3/2002 |
| DE | 20 2012 103513 U1 | 10/2012 |
| DE | 20 2012 100002 U1 | 4/2013 |
| EP | 0 128 795 B1 | 3/1988 |
| EP | 1 917 199 B1 | 5/2008 |
| EP | 1 978 155 A1 | 10/2008 |
| WO | 96/08424 A1 | 3/1996 |
| WO | 2007006272 A2 | 1/2007 |

* cited by examiner

METHOD FOR MATURING MEAT

The present invention concerns a method for the storage and/or aging of meat as well as an element, which comprises a layer of ordered and/or unordered fibers and optionally further layers, for use in the storing and/or aging of meat, and a device for the storage and/or aging of meat.

The quality of meat depends not only on how the animals for slaughter are raised and kept, but also on the treatment and storage of the raw meat after slaughter. Immediately after slaughter, raw meat is tough, and has little taste and poor water retention capacity. It is only through proper storage and aging that it becomes aromatic and easily digestible. Aged meat has better water-binding capacity, it cooks faster, and it remains juicy. Meat aging is a process that takes place within the muscle fibers of the meat and begins immediately after slaughter when the still-warm meat cools off.

The duration of meat aging depends on the respective animal species, ordinarily being only up to three days for poultry and pork, up to a week for veal, and 1½ to 2½ weeks for venison and beef, and it is even possible to obtain beef that has been dry-aged for five weeks.

The meat referred to as dry aged beef (dry aging) is particularly popular with gourmets. In this aging method, the meat hangs on the bone as a whole, in halves, or in pieces (also referred to as "hanging up"). Slow dry aging lasting up to eight weeks makes the meat structure tender, and the water loss of up to 30% makes the characteristic taste of the meat more intense. This long drying process is also reflected in the price of the meat.

A further type of meat aging is called wet aging. Wet aging refers to the aging of meat in vacuum bags with the air sealed out. The lactic acid bacteria inherently present in the meat bring about anaerobic meat aging. The taste of meat aged in a vacuum is less complex, and it has a metallic component and a sour aftertaste. In wet aging, the meat is stored and aged for up to 16 weeks, with the actual aging lasting approx. 2 weeks.

Although the storage and aging of meat can take place under varying conditions, the methods used differ only in sensory parameters such as taste and odor. What is particularly disadvantageous in storage and aging by means of wet aging is the unpleasant odor of the meat that escapes when the vacuum packaging is opened.

The object of the present invention is therefore to provide a method by means of which meat aging can be carried out under the conditions of wet aging, i. e. at lower cost and in a simpler manner, but by means of which one can also obtain meat quality that is largely comparable with that achieved in dry aging. A further object is to provide a method in which sensory properties, particularly odor and taste, are improved.

The subject matter of the present invention is a method for the storage and/or aging of meat, in which raw meat is stored in the presence of alkaline and/or alkaline earth metal carbonate that is made available in a matrix of aligned and/or non-aligned fibers.

Surprisingly, it was found that when raw meat is aged in the presence of a matrix in which alkaline and/or alkaline earth metal carbonate is made available, the method can be carried out more easily, specifically under the economically preferable conditions of wet aging, without having to do without the taste quality achieved by means of dry aging. In order to carry out the process, the raw meat can be used in the form of entire animals on the bone, in halves, or in pieces. In the following, the term "meat" will be used for all types of meat, as well as fish, without specifying the type of food, the type of dismemberment, or the size of the piece.

The method according to the invention is not only suitable for the process referred to as wet aging, but can also be used in the storage of all types of meat (beef, veal, poultry, venison) or even fish throughout the channel of distribution, from slaughtering to sale to the end consumer in supermarkets.

The inventors have found that the liquid leaking out of foods is absorbed by the matrix of aligned and/or non-aligned fibers. It was found that not only the liquid, but also unpleasant odors are absorbed. It is thought that the meat juice forms a lactate with the alkaline or alkaline earth metal carbonate. Lactate is known to act as a preservative and acid buffer in foods.

According to the invention, the meat is stored in the presence of an alkaline and/or alkaline earth metal carbonate. The alkaline and/or alkaline earth metal carbonate can be selected from carbonates and/or hydrogen carbonates of Na, K, Rb, Cs, Li, Mg, Ca, Ba, Sr and any desired mixtures thereof. Particularly preferred are sodium carbonate, sodium hydrogen carbonate, calcium carbonate, and/or calcium hydrogen carbonate. The carbonates may optionally be mixed with other substances suitable for use in foods, which for example affect the diffusion capacity and/or moisture sensitivity of the carbonates.

In carrying out the method, it has been found that the carbonate is advantageously used in particle form. The particle size of the carbonate should be selected in such a way that the particles can be processed in facilities for the production of web materials (layers) of fibers, which serve as a matrix, and are maintained in such a material. Carbonates with a grain size of between 100 and 800 µm have proven to be quite suitable.

A fabric of aligned and/or non-aligned fibers is preferably used as a matrix. A layer of fiber fill deposited in an air stream, for example cellulose fibers or synthetic fibers, has been found to be highly suitable as a matrix. The particulate carbonate can be added in a continuous process during production of this material. The particulate carbonate is loosely held in place by the fibers; it is assumed that further bonding between the fibers and carbonate does not take place.

However, it is also possible to spray the fibers with a solution or suspension of carbonate, after which the solvent is removed.

If the fiber matrix is in the form of a fabric material, the carbonate is preferably used in an amount of 10 to 200 g/m$^2$, and particularly 20 to 100 g/m$^2$.

The mass per unit area of the fiber material used according to the invention with embedded alkaline and/or alkaline earth metal carbonate can be from 100 to 800 g/m$^2$.

In order to carry out the method according to the invention, the meat and the carbonate embedded in a matrix are preferably placed in a chamber, the chamber is closed, and the meat is stored under specified conditions, e.g. moisture content and temperature, until the meat has been aged to the desired extent. The chamber can be sealed in an air-tight manner. The chamber can be a food package known from the prior art such as a baglike package or a suitable food container, which should preferably be weldable, or a package composed of a shell and an outer packaging such as a bag and/or a film. In a possible embodiment, the package is vacuumed and then welded shut (sealed).

Packages known from the prior art and suitable for the method according to the invention are bags and films, including vacuum bags, vacuum films, shrink-bags, shells with a cover or a wrapping, skin packs and MAP (modified atmosphere packaging) packages, or any desired combination thereof. Aging can take place in a temperature range from the freezing point of the meat to room temperature, approx. −5° C. to 20° C., and preferably −1 to 6° C. The aging period is ordinarily 1 to 15 weeks, depending on the aging temperature. In the case of long transportation routes in particular, such as ocean transport, aging frequently takes place in a range of −1° C. to 6° C. over 10 to 15 weeks.

According to the invention, the carbonate is made available in a matrix of aligned and/or non-aligned fibers. This matrix is preferably placed in a package in the form referred to as a pad or mat, the food is stored on this pad, and the package is sealed. In this manner, the matrix simultaneously serves as a support for the food.

As mentioned above, the matrix used according to the invention is preferably a layer of fibers, which are preferably present in the form of a nonwoven-like or tissue-like material. Cellulose fibers are preferred, as these materials are inexpensive and commercially available, and are easy to process. Airlaid nonwovens or tissue papers have been found to be particularly suitable as absorption layers. In a preferred embodiment, the absorption layer of cellulose fibers is an airlaid. In a particularly preferred embodiment, the cellulose layer has embossed areas distributed over its surface in which the fibers are compressed together more strongly than in the other areas and are therefore bonded together without using glue or bonding agents. The absorbent core in this embodiment is preferably produced from a fibrous web of cellulose fibers which, during production of the embossed areas in the printing area, are calendered in a dotted or lined pattern and bonded together without using a bonding agent. The production of such materials is described, for example, in EP 1032342. In this embodiment, the fiber layer of the cellulose fibers is structured in such a way that the cellulose fibers outside these discrete embossed areas are loosely placed on one another or bonded to one another only weakly, while those in the embossed areas are compressed together, forming a tight bond with the respectively adjacent cellulose fibers. This configuration allows the cellulose fibers to be bonded together without requiring any adhesives or binding agents whatsoever, which allows simple and complete recycling. In the embossed areas, the fibers do not simply adhere to one another. Rather, the application of pressure firmly bonds together the adjacent cellulose fibers in these embossed areas. This composite bond is also capable of withstanding the effect of moisture, so that the absorption layer used according to the invention is characterized by mechanical load-bearing capacity even when wet. The areas outside the discrete embossed areas, in which the fibers are loosely placed on one another or bond to one another only weakly, are characterized by favorable absorption capacity. The moisture-binding agents are preferably present in these areas. They can be distributed inside of the individual cellulose fibers, and in the areas outside the discrete embossed areas, they are in favorable contact with the environment, particularly with water, because of the loose composite bond of cellulose fibers. If large amounts of moisture or liquid are present, these are absorbed by the loose composite bond of cellulose fibers, distributed over the entire surface of the absorption layer, and retained there.

In order to increase stability, the matrix of aligned and/or non-aligned fibers can optionally have further layers, such as webs, that are arranged above and/or below this layer of fibers. In addition, a base layer and/or covering layer may also be configured. This base layer and the covering layer can be larger than the further layers immediately adjacent to the fiber layer and be sealed at the edges, thus forming an element that is closed to the carbonate particles. This configuration is advantageous in that the carbonate particles, which are loosely held in place in the fiber layers, do not come into direct contact with the meat. The base layer and/or the covering layer can be the same or different, and are preferably composed of cotton, a nonwoven, a fabric and/or a perforated film. The subject matter of the present invention also includes an element for use in the storage and/or aging of meat that comprises a layer of ordered and/or unordered fibers and optionally further layers, which is characterized by containing alkaline and/or alkaline earth metal carbonates and/or hydrogen carbonates in solid form.

The moisture-regulating element according to the invention is preferably a flat body. This can be cut to the desired size, and the meat can be placed on it during storage. Storage can be carried out in a type of packaging, and the element can be placed in this packaging or be part of it. The layer of fibers is advantageous in that on the one hand, it can act as a kind of carrier material for the carbonate, and on the other hand, fibers, particularly cellulose fibers, show absorption properties, i.e. liquid leaking from the meat is absorbed by the fiber layer, so the meat does not come into contact with this liquid during storage.

Also included in the subject matter of the present invention is a device for the storage and/or aging of meat whose components are a chamber for enclosing the piece of meat and an element that can be placed in this chamber, which comprises a layer of ordered and/or unordered fibers and optionally further layers, and in which alkaline and/or alkaline earth metal carbonates and/or hydrogen carbonates are provided in solid form.

Figure 2:
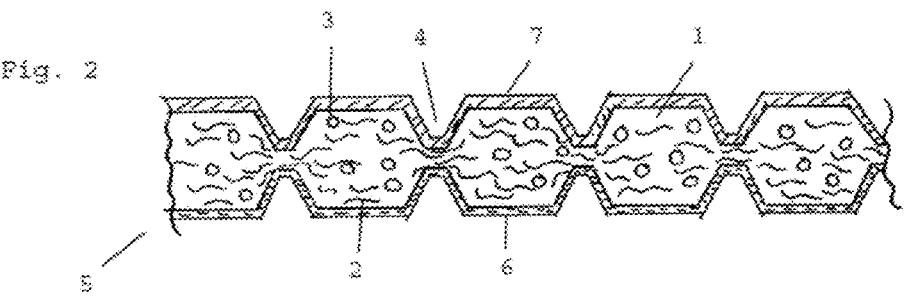
Figure 3:
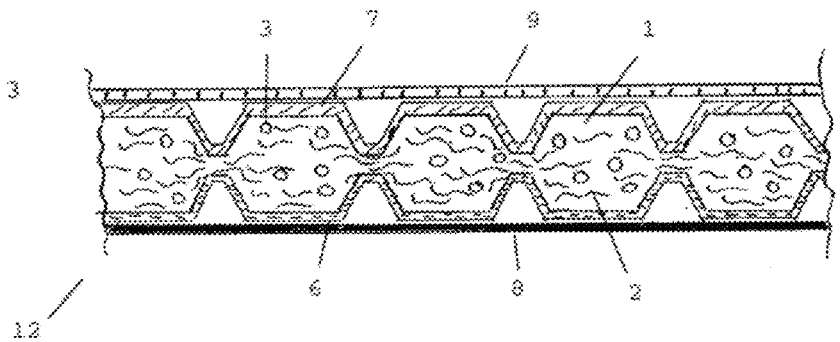
Figure 4:
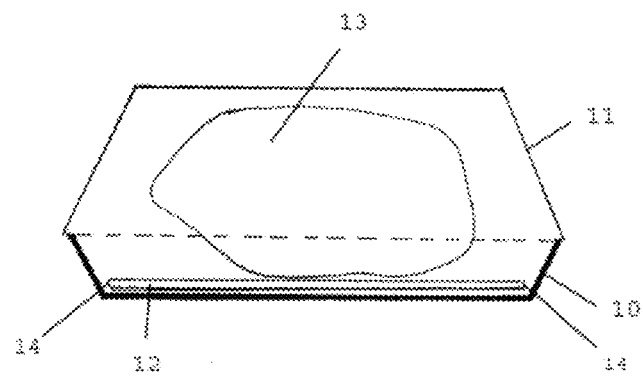
Figure 5:
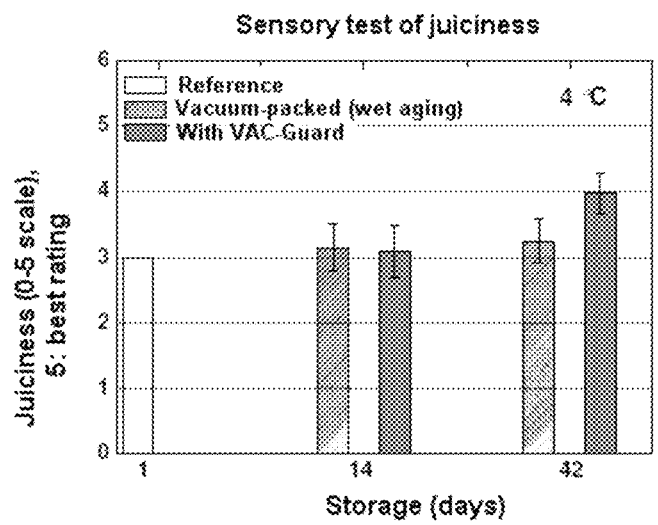
Figure 6:
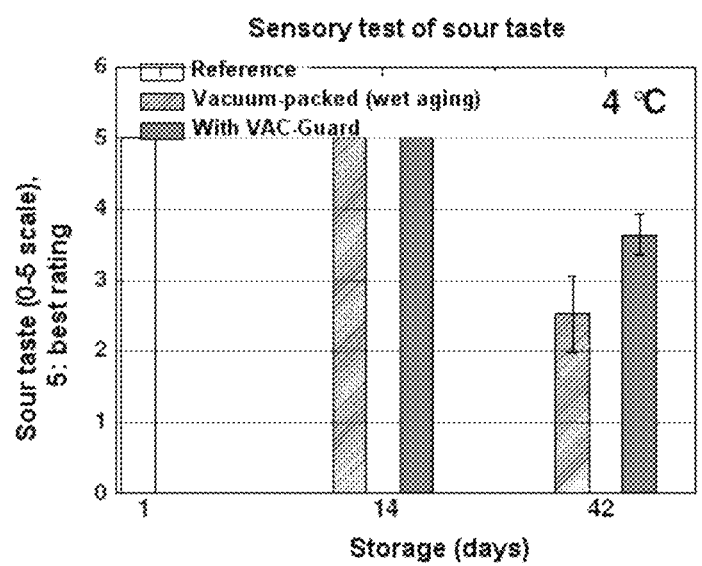
Figure 7:
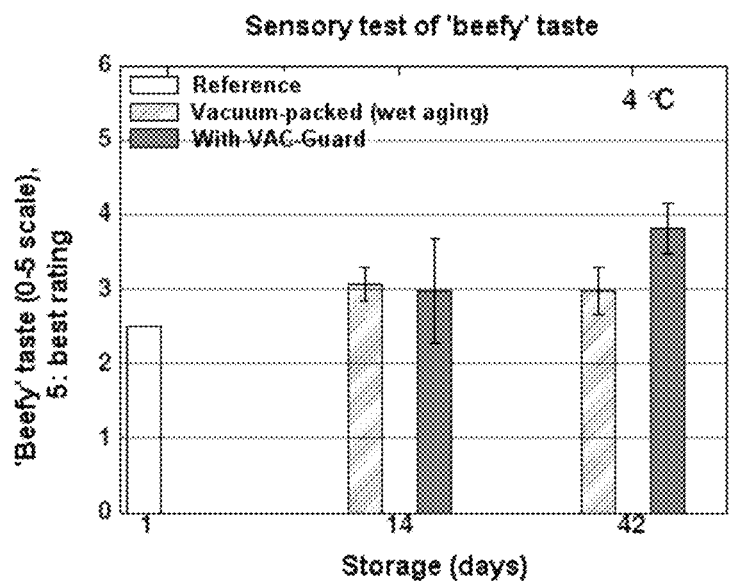
Figure 8:
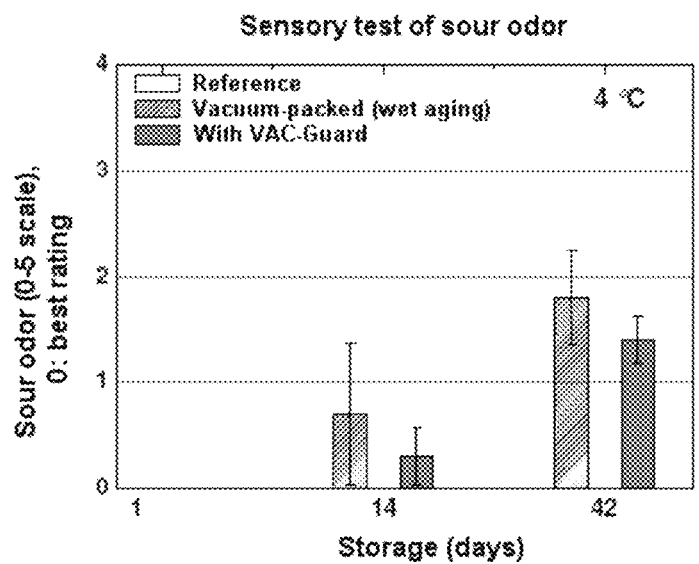
Figure 9:
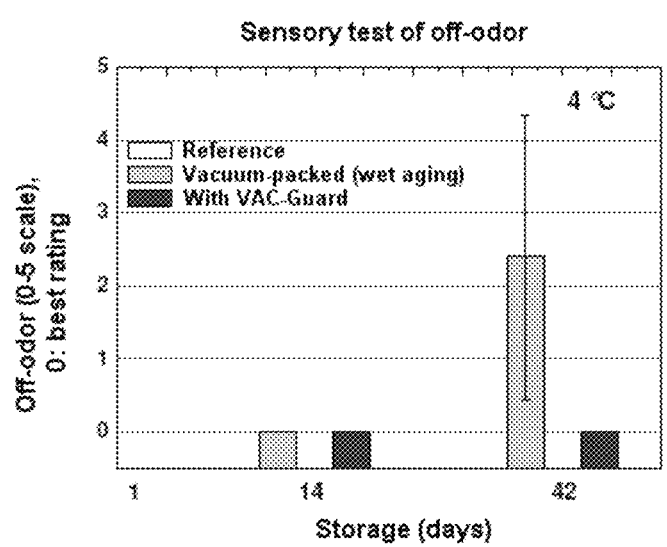

In the following, the matrix used according to the invention is explained in greater detail by means of an example with reference to the drawings. In this example, the matrix is used as a flat element. Shown are:

FIG. 1 a greatly enlarged section through the element,

FIG. 2 a greatly enlarged section through a multilayer element,

FIG. 3 a greatly enlarged section through a further multilayer element,

FIG. 4 a section through a package,

FIGS. 5 to 7 graphical representations of the results of the sensory test of aged meat.

FIG. 1 shows a section through the element 12 consisting of fibers used according to the invention into which carbonate is embedded (immobilized). This element shows a layer 1 that contains a high percentage of fibers 2, into which particulate carbonate 3 is incorporated. The layer 1 forms the core of the element 12.

The cellulose fibers 2 are compressed in the embossed areas 4 and thus bonded together. In the embodiment shown here, the embossed areas 4 are located facing one another on the upper and lower side, so that only a narrow bridge of interconnected fibers remains in each embossed area 4. The other areas of the layer 1 located between each of the embossed areas 4 show loose fiber layering. There is no tight bond between the fibers 2 in these areas.

The absorption behavior and moisture-retention capacity, particularly for meat juice, is determined by the layer 1 of fibers 2 and the carbonate 3, and optionally by further substances than can be incorporated into the layer 1. In the embodiment shown here, the layer 1 has the form in the embossed areas 4 of a truncated pyramid or truncated cone, with the angle of the inclines formed preferably being between 10° and 45°.

Provided that cellulose material is used for the fibrous web 1, inexpensively available bulk material may be used. Preferably, the material referred to as fluff pulp, which is characterized by excellent bonding behavior, is used, as it improves the mechanical strength of the element against vertical tensile forces.

In producing the element according to the invention, a web material is first produced and then cut to the desired size. The elements used are ordinarily in the form of a mat (also referred to as a pad).

In producing the web material by a continuous method, the fibrous web that will later form the layer 1 is produced from fiber fill 2 deposited in an air stream, preferably from defibrated cellulose (wood pulp), carbonate 3, and optionally, any further incorporated materials. For the cellulose fibers, renewable wood raw materials available on the market may be used.

The method of using fiber fill as the starting product for the layer 1 allows the fibers 2 to be processed in a drier manner and thus allows excellent compression of the cellulose fibers in the discrete embossed areas 4 during subsequent embossing of the multilayer web between two structural rollers. Outside of these embossed areas 4, the fibers are loosely placed on one another, thus retaining the carbonate particles inside these loose areas, and the embossed areas prevent the particles from moving inside the element and becoming concentrated in one place. Moreover, the flexibility of the element 1 is improved by means of the loose layering of the fibers between the respective embossed areas.

The element according to the invention is preferably produced from web material that is manufactured by a continuous process. In air-supported layering, the fibers 2 and the carbonate 3, and optionally further aggregates, are arranged to form the layer 1. After this, the embossed areas 4 are produced in a calender with two structured calender rollers. A possible production method is disclosed, for example, in EP 1032342.

Depending on the intended thickness of the finished web, it is also possible to stratify multiple layers of fibers 2 and carbonate 3, and optionally further aggregates, atop one another and then introduce them into the calender in order to obtain the embossed areas 4. In this manner, the moisture-binding agents are incorporated into the web in a layered manner. Homogeneous distribution is achieved when the moisture-binding agents together with the cellulose fibers, i.e. uniformly distributed in the cellulose fibers, are processed into web material.

For example, a multilayer web 5, as shown in FIG. 2, can be produced by first using a covering layer 6 and/or a base layer 7 as a covering layer. The fill of fibers 2 and carbonate 3 is deposited in an air stream on this carrier layer 6 or 7. After this, this arrangement of the carrier layer and fill is fed together through the structural rollers of the calender. Alternatively, the other of the two layers 6, 7, which does not yet constitute the carrier layer, can also be applied to the cellulose layer 1 first, i.e. before finally being fed through the calender.

The two layers 6 and 7 can also be applied subsequently, optionally with further layers, in a manner known per se. If the further layers are subsequently applied, they may have any desired surface structure, e.g. they may be smooth or have a rough surface.

The embodiment shown in FIG. 2 has a total of 3 layers, and specifically is a web composed of layers 6, 1, and 7.

The bottom layer serves as a base material, and another layer is applied as the upper layer. The covering layer 6 is advantageous in that the meat does not come into direct contact with the fibers and the carbonate.

Particularly suitable as a base material and also as a covering layer 6 are materials that are permeable to water and steam but impermeable to the incorporated carbonate and optionally present further components. Examples of suitable materials are nonwoven-like materials and cellulose-based and/or plastic-based fabric or film that is perforated or made permeable to liquid in another manner, such as that described in EP 1917199.

The side edges of the element can be open or closed. Welding of the edges can be carried out by means of ultrasonic welding, point welding, thermal welding, or bonding. In welding the side edges, it is not necessarily required for these to be completely sealed, but it is also advantageous if the fiber matrix and the carbonate do not leak out from the meat when the meat places a load on the element matrix.

FIG. 3 shows an element according to the invention that has the same structure as the element in FIG. 2, but is surrounded by further layers 8 and 9. These further layers 8 and 9 can be larger than the layer 1 and the layers 6 and 7 optionally arranged thereon. The layers 8 and 9 can be the same or different and serve to adapt the properties of the element to the specific requirements of the product to be stored. These further layers can be bonded together without including the layer 1 and/or the layers 6 and 7 optionally arranged thereon. These two layers form a wrapping for the element. They can be composed of textile, nonwoven-like, or film-like material or fabric. At least one of the layers 8 or 9 of this wrapping should be permeable to moisture. Preferably, the layers 8 or 9 are selected from cotton, a nonwoven, a fabric and/or a perforated film. In a possible embodiment, one of the further layers 8, 9 is impermeable to moisture. In such an embodiment, for example, the layer 9 facing the product can be permeable to moisture, and the layer 8 facing the packaging can be impermeable to moisture. In this embodiment, in the event that the moisture-binding capacity of the element according to the invention 12 is exhausted and the pressure of the product 13 on the element 12 almost causes liquid to be pressed out and collect on the bottom of the package 10, this liquid is prevented from flowing back in the direction of the product through this lower layer.

FIG. 4 shows a possible configuration in which the meat can be stored. This embodiment has the form of a food package and consists of a bottom tray 10 and a cover 11, in which the element 12 according to the invention is placed. The element 12 serves as a support for the raw meat 13, and the package is closed with the cover 11. Depending on the configuration of this product composed of a bottom tray 10 and a cover 11, a vacuum can be applied.

The embodiment shown in FIG. 4 provides the possibility of aging raw meat in cut form.

Test Report, Meat Aging

Meat aging is an important criterion for the quality of beef. Enzymatic processes cause proteolysis, which makes the meat tender. Of course, aging conditions play an important role. An essential criterion is contact with the meat serum. If this contact lasts for a lengthy period, an undesirable metallic taste may develop. In classical aging, the meat is surrounded only by air. Depending on the relative humidity, the upper layers will dry out to a greater or lesser degree, and discoloration and even mold may occur. Although these effects can be largely prevented by means of a controlled atmosphere, they result in considerable expense.

Aging of meat ordinarily takes place in vacuum packaging. This makes favorable hygienic conditions possible and makes it possible to prevent drying and losses due to excessive drying and discarding of the meat. However, the meat is in permanent contact with the serum, which negatively affects the quality of taste. This drawback can be overcome by using moisture-absorbing pads that absorb free liquid.

Test Batch

Roast beef (longissimus dorsi) is vacuum-packed in 1 kg pieces with and without a moisture-absorbing pad. Storage is carried out at 4° C. for a total of 42 days. Depending on the stock (immediately, 2, 4, and 6 weeks) and packaging variant, 5 samples each are tested.

Pads used:
Standard pad (pad) (prior art)
Pad with carbonate (invention)
Assessment is carried out using the following parameters:
Visual inspection of the package
Odor assessment
pH
Color
Free amounts of serum present in the package
Cutting resistance
Microbiological tests
After preparation (slices approx. 25 mm thick; contact grill; medium consistency):
Cooking losses
Sensory evaluation
Odor
Taste
Texture Test Material Roast beef (longissimus dorsi) from animals slaughtered on the previous day of the same sex and age kept in the region under identical conditions (same feed, pen) was cut into 800-1000 g pieces and vacuum-packed with or without a pad.

The beef was stored in a temperature test chamber at 4.0±0.1° C.

Odor Assessment

Odor assessment was carried out about 3-5 minutes after opening the package in the microbiology laboratory by 3 persons. A simple descriptive test modeled after L00.90-60 of the Official Compilation of Test Methods pursuant to § 64 LFGB [Food and Feed Code] was used. The classification of points is shown in Table 2.

TABLE 2

| Odor assessment | |
|---|---|
| Points | Assessment |
| 0 | Fully satisfactory |
| 1 | Acceptable, but very small deviation perceptible |
| 2 | Acceptable, small deviations perceptible |

TABLE 2-continued

| Odor assessment | |
|---|---|
| Points | Assessment |
| 3 | Barely acceptable, deviation present |
| 4 | Unacceptable, pronounced odor deviation |
| 5 | Extreme odor deviation |

Odor was assessed for the parameters "sour" and "spoiled" according to the classification shown in Table 2.

| | Parameter 1 | Parameter 2 | Parameter 3 | Parameter 4 | Parameter 5 |
|---|---|---|---|---|---|
| Texture and taste test | Tenderness | Sour taste | Juiciness | Meaty taste | Metallic off-taste |

The test was carried out in compliance with the DLG [German Agricultural Society] method for sensory analysis. In the test, each test parameter is assigned characteristic properties or defect descriptions. These are assessed according to a product-specific 5-point scale. The DLG method of sensory analysis is a "Descriptive sensory test with integrated evaluation" and its method is derived, among other sources, from DIN 10964, "Simple descriptive test" and DIN 10969, "Descriptive test with subsequent quality assessment."

TABLE 3

| 5-point assessment scale according to DLG | | | | |
|---|---|---|---|---|
| Scale range (grades) | Quality description | Quality requirements | Characteristic features | Quality ranges |
| 5 | Very good | Perfect, completely meets requirements | Desirable | High quality |
| 4 | Food | Minor deviations | | |
| 3 | Satisfactory | Noticeable deviations, conditionally meets requirements | Tolerable | Average quality |
| 2 | Less satisfactory | Clear defects | | |
| 1 | Unsatisfactory | Serious defects, does not meet requirements | Undesirable | Insufficient quality |
| 0 | Unacceptable | Completely altered, inedible | | |

FIGS. 5 through 9 shows the results of the sensory test in graph form.

LIST OF REFERENCE NOS.

1 Layer
2 Fibers
3 Carbonate
4 Embossed area
5 Multilayer web
6 Covering layer
7 Base layer
8, 9 Further layers
10 Bottom tray
11 Cover
12 Element according to the invention
13 Stored product
14 Side edge

The invention claimed is:

1. A process for wet aging of beef or venison in which the beef or venison is stored in an air-tight vacuum chamber in the presence of solid alkaline and/or alkaline earth metal carbonate (3) which reacts with meat juice leaking from the beef or venison and forms a lactate with the solid alkaline and/or alkaline earth metal carbonate (3), wherein the solid alkaline and/or alkaline earth metal carbonate (3) is present in an amount of 10 to 200 g/m$^2$ and is made available in a matrix (1) of aligned and/or non-aligned fibers that absorbs the liquid leaking from the beef or venison and absorbs odors, and wherein the beef or venison and the matrix (1) are placed in the air-tight vacuum chamber, wherein the matrix (1) comprises closed side edges and a perforated film on one surface of the matrix and a nonwoven material on an opposite surface of the matrix, wherein the perforated film and the nonwoven material together wrap the matrix, wherein the perforated film is permeable to moisture, wherein the matrix comprises a cellulose layer having embossed areas distributed over its surface, wherein a fibrous web of cellulose fibers which, during production of the embossed areas, are calendered in a dotted or lined pattern and bonded together without using a bonding agent to bond together adjacent cellulose fibers in the embossed areas and provide mechanical load-bearing capacity even when wet, wherein fibers in areas outside of the embossed areas have a favorable absorption capacity compared to the cellulose fibers in the embossed areas due to loosely placed fibers in the areas outside the embossed areas, and wherein the embossed areas retain the solid alkaline and/or alkaline earth metal carbonate (3) within the embossed areas to prevent the solid alkaline and/or alkaline earth metal carbonate (3) within the embossed areas from moving inside the matrix and becoming concentrated.

2. The process as claimed in claim 1, characterized in that further layers (6,7) are arranged above and/or below the matrix (1).

3. The process as claimed in claim 1, characterized in that the alkaline and/or alkaline earth metal carbonate is selected from carbonates and/or hydrogen carbonates of Na, K, Rb, Cs, Li, Mg, Ca, Ba, Sr, or any mixtures thereof.

4. The process as claimed in claim 3, characterized in that the alkaline and/or alkaline earth metal carbonate is selected from the group consisting of sodium carbonate, sodium hydrogen carbonate, calcium carbonate, and calcium hydrogen carbonate.

5. The process of claim 1, wherein a grain size of the alkaline and/or alkaline earth metal carbonate (3) which is present in particle form is 100 to 800 µm.

6. The process of claim 1, further comprising aging the beef or venison using the chamber which comprises the beef or venison and the matrix (1) at a temperature of −5° C. to 20° C.

7. The process of claim 1, further comprising aging the beef or venison using the chamber which comprises the beef or venison and the matrix (1) at a temperature of −1° C. to 6° C.

8. The process of claim 1, further comprising aging the beef or venison using the chamber which comprises the beef or venison and the matrix (1) at a temperature of −1° C. to 6° C. over 10 weeks to 15 weeks.

9. The process of claim 1, characterized in that the alkaline and/or alkaline earth metal carbonate (3) is in particle form.

10. The process of claim 1, characterized in that the matrix (1) of aligned and/or non-aligned fibers (2) is in the form of a fabric.

11. The process of claim 2, characterized in that a base layer (8), and optionally on the opposite side, a covering layer (9), are arranged above and/or below the further layers (6, 7).

12. The process of claim 11, wherein the base layer (8) or the covering layer (9) comprises the perforated film.

13. The process of claim 1, wherein the matrix comprises a cellulose layer having embossed areas distributed over its surface, wherein a fibrous web of cellulose fibers which, during production of the embossed areas, are calendered in a dotted or lined pattern and bonded together without using a bonding agent.

14. The process of claim 11, wherein the base layer (8) is impermeable to moisture and the covering layer (9) is permeable to moisture.

* * * * *